United States Patent
Kosaka et al.

(10) Patent No.: US 6,448,304 B1
(45) Date of Patent: Sep. 10, 2002

(54) OPTICAL MATERIALS HAVING GOOD ULTRAVIOLET ABSORBABILITY AND METHOD FOR PRODUCING THEM

(75) Inventors: Masahisa Kosaka; Shinsuke Itoh, both of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/666,414

(22) Filed: Sep. 20, 2000

(30) Foreign Application Priority Data

Sep. 20, 1999 (JP) .......................................... 11-265321

(51) Int. Cl.$^7$ .......................... G02C 7/04; C08K 5/3492
(52) U.S. Cl. ...................... 523/106; 264/1.1; 264/1.32; 264/1.7; 264/1.8; 351/160 H; 351/166; 427/160; 427/353; 427/354; 428/412; 524/91; 524/337; 524/357
(58) Field of Search .......................... 351/160 H, 166; 524/357, 337, 91; 264/1.1, 1.32, 1.7, 1.8; 428/412; 427/160, 353, 354; 523/106

(56) References Cited

U.S. PATENT DOCUMENTS

| | | | |
|---|---|---|---|
| 3,001,970 A | * 9/1961 | Ebel et al. | |
| 3,240,752 A | * 3/1966 | Tamblyn | |
| 3,309,220 A | 3/1967 | Osteen | |
| 3,382,183 A | * 5/1968 | Donoion et al. | |
| 3,493,536 A | * 2/1970 | Weisfeld | |
| 3,499,869 A | * 3/1970 | Lappin et al. | |
| 3,506,620 A | * 4/1970 | Davis et al. | 260/75 |
| 3,872,042 A | * 3/1975 | Bond | |
| 4,028,331 A | * 6/1977 | Hotta et al. | |
| 4,304,895 A | 12/1981 | Loshaek | |
| 4,311,762 A | * 1/1982 | Spycher et al. | 428/412 |
| 4,323,597 A | * 4/1982 | Olson | |
| 4,390,676 A | 6/1983 | Loshaek | |
| 4,528,311 A | 7/1985 | Beard et al. | |
| 4,636,212 A | 1/1987 | Posin et al. | |
| 4,680,369 A | * 7/1987 | Kajimoto et al. | |
| 4,719,248 A | 1/1988 | Bambry et al. | |
| 4,770,905 A | * 9/1988 | Silbermann et al. | 427/160 |
| 4,775,733 A | * 10/1988 | Kanemura et al. | 528/67 |
| 4,872,877 A | * 10/1989 | Tiffany | 351/160 H |
| 5,080,688 A | 1/1992 | Cohen | |
| 5,098,445 A | 3/1992 | Hung et al. | |
| 5,681,871 A | * 10/1997 | Molock et al. | 351/160 H |
| 6,201,061 B1 | 3/2001 | Amagai et al. | 524/720 |
| 6,218,463 B1 | 4/2001 | Molock et al. | 524/720 |
| 6,244,707 B1 | * 6/2001 | Faubl | |

FOREIGN PATENT DOCUMENTS

| | | |
|---|---|---|
| JP | 05-105772 | 8/1993 |
| JP | 10-186291 | 10/1998 |

OTHER PUBLICATIONS

Defensive Publication No. T943,009–Smith et al, Feb. 3, 1976.*
Wang, Synthesis and properties of benzotriazoles as UV absorbers; Journal of East China University of Science and Technology; 25(2); pp. 167–169, 173; Apr., 1999.
Japanese Patent Abstract, 62254119 A.
Japanese Patent Abstract, 09265059 A.
Japanese Patent Abstract, 01230003 A.
Japanese Patent Abstract, 02093422 A.
Japanese Patent Abstract, 02171716 A.
Japanese Patent Abstract, 58122501 A.

* cited by examiner

*Primary Examiner*—Peter Szekely
(74) *Attorney, Agent, or Firm*—Morrison & Foerster LLP (57) ABSTRACT

An optical material, particularly a plastic lens for spectacles, which absorbs almost all UV rays of up to around 400 nm or so and is not too yellow, is obtained by dipping a poly(thio)urethane material or a diethylene glycol bisallylcarbonate polymer material in a solution containing:

(1) a dibenzoylmethane compound of a general formula (1):

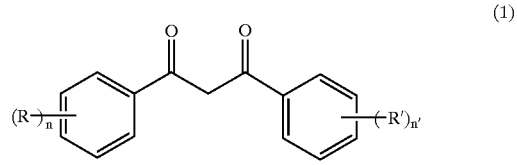

wherein R and R' each represent a linear or branched alkyl or alkoxyl group having from 1 to 8 carbon atoms; and n and n' are the same or different integers, each falling between 0 and 3, or (2) a benzotriazole compound of a general formula (2):

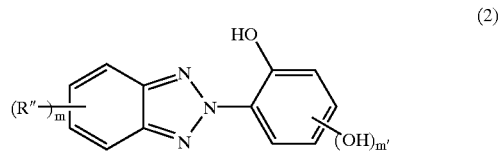

wherein R" represents a hydrogen atom, a chlorine atom or a bromine atom; and m and m' each indicate 1 or 2.

15 Claims, 2 Drawing Sheets

FIG. 2

OPTICAL MATERIALS HAVING GOOD ULTRAVIOLET ABSORBABILITY AND METHOD FOR PRODUCING THEM

REFERENCE TO RELATED APPLICATIONS

This application claims priority from Japanese Application No. 11-265321, filed Sep. 20, 1999. This application discloses subject matter related to subject matter disclosed in co-pending U.S. patent application Ser. No. 09/666,415, filed Sep. 20, 2000, which claims priority from Japanese Application No. 11-265297, filed Sep. 20, 1999. The entire disclosure of Ser. No. 09/666,415 is hereby incorporated by reference, as are the entire disclosures of U.S. patents and patent applications referred to in this application.

TECHNICAL FIELD OF THE INVENTION

The present invention relates to optical materials, particularly, plastic lenses of good UV absorbability for spectacles, and to a method for producing them. More precisely, the invention relates to plastic lenses for spectacles, which absorb long-wave UV rays having a wavelength of around 400 nm or so and are not too much yellowish, and relates to a method for producing them.

BACKGROUND OF THE INVENTION

UV rays are electromagnetic radiation having a wavelength of from around 200 to 400 nm or so, and are said to have some negative influences on human bodies. In the field of lenses for spectacles, there is increasing a demand for UV-absorbing lenses for protecting human eyes from UV rays.

Various methods are known for producing UV-absorbing plastic lenses for spectacles. The first method comprises incorporating a UV absorbent such as 2,2'-dihydroxy-4-methoxybenzophenone, 2,2'-dihydroxy-4-n-octoxybenzophenone or the like to a plastic lens monomer followed by polymerizing the monomer to give plastic lenses, as in Japanese Patent Laid-Open Nos. 50049/1975, 122501/1983, 171716/1990, 93422/1990 and 254119/1987.

The second method is for coloring plastic lenses, comprising dipping plastic lenses in an aqueous solution with a UV absorbent dispersed therein, under heat at 80 to 100° C., thereby to infiltrate the UV absorbent into the plastic lenses (Japanese Patent Laid-Open No. 230003/1989).

The third method comprises applying a substance capable of absorbing and/or scattering UV rays onto plastic lenses (Japanese Patent Laid-Open No. 265059/1997).

Of those methods, it is presumed that the majority of conventional, commercially-available plastic lenses for spectacles capable of absorbing UV rays of up to 400 nm will be produced according to the second method.

The first method disclosed in Japanese Patent Laid-Open Nos. 171716/1990, 93422/1990 and 254119/1987 is for improving the lightfastness of plastic lenses. In case where lenses capable of absorbing UV rays of up to around 400 nm or so are produced according to the first method in which are used conventional UV absorbents (2,2'-dihydroxy-4-methoxybenzophenone, 2,2'-dihydroxy-4-n-octoxybenzophenone, etc.), and especially where diethylene glycol bisallylcarbonate which is one typical material for plastic lenses for spectacles is used for producing such UV-absorbing lenses, some problems are inevitable. One problem is that the plastic lenses produced are often extremely yellowish and their appearances are therefore poor; and another is that a large amount of the UV absorbent is used, therefore having some negative influences on the polymerization reaction, and the physical properties of the plastic lenses produced are often poor.

The second method for producing plastic lenses capable of absorbing UV rays of up to around 400 nm or so is also problematic in that the UV absorbent to be used therein must have a high degree of UV absorbability and have a suitable degree of solubility in water, and that the plastic lenses produced therein could not have a satisfactory degree of UV absorbability, or even if they could have it, the dipping time for them shall be prolonged and the plastic lenses produced are often yellowish. In place of using water as in the second method, another method of using an organic solvent has been proposed. However, this is still problematic in that the plastic lenses produced therein and capable of absorbing UV rays of up to around 400 nm or so are often extremely yellowish.

The third method is also not suitable for obtaining plastic lenses capable of absorbing UV rays of up to around 400 nm or so.

Due to the deficiencies of the known methods, there exist a need for obtaining plastic lenses that are not too yellow in color and yet would be capable of absorbing UV rays of up to around 400 nm.

SUMMARY OF THE INVENTION

The present invention solves the problems noted above and provides a method for producing plastic lenses for spectacles, in which the plastic lenses produced have an improved ability to absorb WV rays of up to around 400 nm or so but are not so yellow like conventional plastic lenses for spectacles, and in which the amount of the UV absorbent to be added to the lenses is reduced.

Applicants have unexpectedly found that when a specific UV absorbent is infiltrated into optical materials, specifically plastic lenses, the resulting lenses can have an excellent ability to absorb WV rays of up to around 400 nm or so and are not unacceptably yellowish in color.

One embodiment of this invention is an optical material comprising a poly(thio)urethane material or a diethylene glycol bisallylcarbonate polymer material and a dibenzoylmethane compound on a surface or near a surface of the poly(thio)urethane material or the diethylene glycol bisallylcarbonate polymer material, the dibenzoylmethane compound having a general formula (1):

(1)

wherein R and R' each represent a linear or branched alkyl group having from 1 to 8 carbon atoms, or a linear or branched alkoxyl group having from 1 to 8 carbon atoms; and n and n' are the same or different integers, each falling between 0 and 3.

A diethylene glycol bisallylcarbonate polymer is a polymer of a diethylene glycol bisallylcarbonate monomer. In a preferred embodiment, the optical material is a plastic lens.

Another embodiment is an optical material comprising a poly(thio)urethane material or a diethylene glycol bisallylcarbonate polymer material and a benzotriazole compound on a surface or near a surface of the poly,(thio)urethane material or the diethylene glycol bisallylcarbonate polymer material, the benzotriazole compound having a general formula (2):

(2)

wherein R" represents a hydrogen atom, a chlorine atom or a bromine atom; and m and m' each indicate 1 or 2.

In another embodiment, the optical material absorbs long-wave UV rays having a wavelength of around 400 nm. In yet another embodiment, the optical material has a yellowness index (YI) falling between about 0.8 and 1.2 and a 385 nm UV transmittance falling between about 1 and 4% when a thickness of the optical material is of from about 1.8 to 2.2 mm.

Another embodiment relates to an optical material comprising a poly(thio)urethane material or a diethylene glycol bisallylcarbonate polymer material and a coating on the poly(thio)urethane material or the diethylene glycol bisallylcarbonate polymer material, the optical material has a yellowness index (YI) falling between about 0.8 and 1.2 and a 385 nm UV transmittance falling between about 1 and 4% when a thickness of the optical material is of from about 1.8 to 2.2 mm.

This invention provides a method for producing an optical material, comprising obtaining a poly(thio)urethane material or a diethylene glycol bisallylcarbonate polymer material and coating the poly(thio)urethane material or the diethylene glycol bisallylcarbonate polymer material with a solution containing a dibenzoylmethane compound of a general formula (1):

(1)

wherein R and R' each represent a linear or branched alkyl group having from 1 to 8 carbon atoms, or a linear or branched alkoxyl group having from 1 to 8 carbon atoms; and n and n' are the same or different integers, each falling between 0 and 3.

This invention also provides a method for producing an optical material, comprising obtaining a poly(thio)urethane material or a diethylene glycol bisallylcarbonate polymer material and coating the poly(thio)urethane material or the diethylene glycol bisallylcarbonate polymer material with a solution containing a benzotriazole compound of a general formula (2):

(2)

wherein R" represents a hydrogen atom, a chlorine atom or a bromine atom; and m and m' each indicate 1 or 2.

These method further comprise subjecting the coated optical material to heat treatment.

DETAILED DESCRIPTION OF THE INVENTION

The UV absorbent to be used in the invention is a dibenzoylmethane compound of the above-mentioned formula (1) or a benzotriazole compound of the above-mentioned formula (2). Compounds of formula (1) are known substances, as described in, for example, Japanese Patent Laid-Open No. 46056/1977; and compounds of formula (2) are also known compounds. However, no one knows that these compounds are usable as a UV absorbent for plastic lenses, and that plastic lenses containing any of them can absorb UV rays of up to, around 400 nm or so and are not so much yellowish like conventional plastic lenses.

In formula (1), R and R' each represent a linear or branched alkyl or alkoxyl group having from 1 to 8 carbon atoms. The linear or branched alkyl group having from 1 to 8 carbon atoms includes a methyl group, an ethyl group, an n-propyl group, an isopropyl group, an n-butyl group, an isobutyl group, a sec-butyl group, a tert-butyl group, a pentyl group (this is meant to indicate all types of isomers, including n-pentyl, isopentyl, etc.—the same shall apply to all groups of isomers referred to herein), a hexyl group, a heptyl group, and an octyl group. The same shall apply to the alkyl moiety of the linear or branched alkoxyl group having from 1 to 8 carbon atoms. Preferably, the alkyl (or alkoxyl) group has from 1 to 4 carbon atoms: Also preferably, n and n' each are 0 or 1.

Specific examples of dibenzoylmethane compounds of formula (1) are dibenzoylmethane, 2-methyldibenzoylmethane, 4-methyldibenzoylmethane, 4-isopropyldibenzoylmethane, 2,4-dimethyldibenzoylmethane, 2,5-dimethyldibenzoylmethane, 4,4'-diisopropyldibenzoylmethane, 2-ethyldibenzoylmethane, 4-ethyldibenzoylmethane, 2-propyldibenzoylmethane, 4-propyldibenzoylmethane, 2-isopropyldibenzoylmethane, 4-isopropyldibenzoylmethane, 2-butyldibenzoylmethane, 4-butyldibenzoylmethane, 4-tert-butyldibenzoylmethane, 2,4-dimethyldibenzoylmethane, 2,5-dimethyldibenzoylmethane, 2,4-diethyldibenzoylmethane, 2,5-diethyldibenzoylmethane, 4,4'-dimethyldibenzoylmethane, 4,4'-diethyldibenzoylmethane, 4,4'-dipropyldibenzoylmethane, 4,4'-diisopropyldibenzoylmethane, 4,4'-dibutyldibenzoylmethane, 4,4'-di-tert-butyldibenzoylmethane, 4-methyl-4'-ethyldibenzoylmethane, 2-methoxydibenzoylmethane, 4-methoxydibenzoylmethane, 2-ethoxydibenzoylmethane, 4-ethoxydibenzoylmethane, 2-propoxydibenzoylmethane, 4-propoxydibenzoylmethane, 2-butoxydibenzoylmethane, 4-butoxydibenzoylmethane, 4,4'-dimethoxydibenzoylmethane, 4,4'-diethoxydibenzoylmethane, 4,4'-dipropoxydibenzoylmethane, 4,4'-diisopropoxydibenzoylmethane, 4,4'-dibutoxydibenzoylmethane, 4-methyl-4'-methoxydibenzoylmethane, 4-methyl-4'- ethoxydibenzoylmethane, 4-methyl-4'-propoxydibenzoylmethane, 4-methyl-4'-butoxydibenzoylmethane, 4-ethyl-4'-methoxydibenzoylmethane, 4-ethyl-4'-ethoxydibenzoylmethane, 4-ethyl-4'-propoxydibenzoylmethane, 4-ethyl-4'-butoxydibenzoylmethane, 4-ethyl-4'-methoxydibenzoylmethane, 4-propyl-4'-ethoxydibenzoylmethane, 4-ethyl-4'-propoxydibenzoylmethane, 4-propyl-4'-butoxydibenzoylmethane, 4-isopropyl-4'-methoxydibenzoylmethane, 4-isopropyl-4'-ethoxydibenzoylmethane, 4-isopropyl-4'-propoxydibenzoylmethane, 4-isopropyl-4'-butoxydibenzoylmethane, 4-butyl-4'-methoxydibenzoylmethane, 4-butyl-4'-ethoxydibenzoylmethane, 4-butyl-4'-propoxydibenzoylmethane, 4-butyl-4'-butoxydibenzoylmethane, 4-tert-butyl-4'-methoxydibenzoylmethane, 4-tert-butyl-4'-ethoxydibenzoylmethane, 4-tert-butyl-4'-propoxydibenzoylmethane, 4-tert-butyl-4'-butoxydibenzoylmethane, etc. Of these, preferred for use in the invention are 4-tert-butyl-4'-methoxydibenzoylmethane and dibenzoylmethane.

In formula (2), R" is preferably a hydrogen atom or a chlorine atom. Also preferably, m and m' each are 1. Specific examples of benzotriazole compounds of formula (2) are 2-(2,4-dihydroxyphenyl)-benzotriazole, 2-(2,4,6-trihydroxyphenyl)-benzotriazole, 5-chloro-2-(2,4-dihydroxyphenyl)-benzotriazole, 5-chloro-2-(2,4,6-trihydroxyphenyl)-benzotriazole, 5-bromo-2-(2,4-dihydroxyphenyl)-benzotriazole, 5-bromo-2-(2,4,6-trihydroxyphenyl)-benzotriazole, dichloro-2-(2,4-dihydroxyphenyl)-benzotriazole, bromochloro-2-(2,4-dihydroxyphenyl)-benzotriazole, etc. Of these, preferred for use in the invention are 2-(2,4-dihydroxyphenyl)-benzotriazole and 5-chloro-2-(2,4-dihydroxyphenyl)-benzotriazole.

Water or an organic solvent such as alcohol or the like is added to the UV absorbent to prepare a TV absorbent solution, in which plastic lenses are dipped. To the UV absorbent solution, optionally added are a surfactant having the ability to improve the dispersibility of the UV absorbent therein, a swelling agent such as benzyl alcohol or the like having the ability to swell plastics, an antioxidant, etc. The amount of the surfactant, if added thereto, is not specifically defined, but may generally fall between 1 and 50 ml per liter of the solvent such as water, etc.

The plastic lenses for spectacles of the invention are produced by dipping poly(thio)urethane lenses or lenses obtained by polymer of a diethylene glycol bisallylcarbonate monomer in a solution of the UV absorbent of formula (1) or (2). The temperature of the UV absorbent solution is not specifically defined, as varying depending on the materials of the plastic lenses to be dipped therein and on the dipping time. From the practical viewpoint, the temperature preferably falls between 40° C. and 100° C.

Poly(thio)urethane lenses of the invention include polythiourethane lenses and polyurethane lenses, and these are produced by polymerizing a thiourethane monomer or a urethane monomer. Concretely, the monomers include a combination of a polyisocyanate compound and a polythiol compound,: and a combination of a polyisocyanate compound and a polyol compound.

The polyisocyanate compound is not specifically defined, including, for example, alicyclic isocyanate compounds such as hydrogenated 2,6-tolylene diisocyanate, hydrogenated meta- and para-phenylene diisocyanates, hydrogenated 2,4-tolylene diisocyanate, hydrogenated diphenylmethane diisocyanate, hydrogenated metaxylylene diisocyanate, hydrogenated paraxylylene diisocyanate, isophorone diisocyanate, etc.; isocyanate compounds, such as meta- and para-phenylene diisocyanates, 2,6-tolylene diisocyanate, 2,4-tolylene diisocyanate, 4,4'-diphenylmethane diisocyanate, meta- and para-xylylene diisocyanates, meta- and para-tetramethylxylylene diisocyanates, 2,6-naphthalene diisocyanate, 1,5-naphthalene diisocyanate, hexamethylene diisocyanate, octamethylene diisocyanate, 2,2,4-trimethylhexamethylene diisocyanate, tetramethylene diisocyanate, biuret reaction products of hexamethylene diisocyanate, trimers of hexamethylene diisocyanate, lysine diisocyanate, lysine triisocyanate, 1,6,11-undecane triisocyanate, triphenylmethane triisocyanate, etc.; sulfur-containing isocyanate compounds such as diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate, 4,4'-dimethoxydiphenyldisulfide-3,3'-diisocyanate, diphenylsulfone-4,4'-diisocyanate, diphenylsulfone-3,3'-diisocyanate, benzylidenesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatobenzylsulfone, 4,4'-dimethyldiphenylsulfone-3,3'-diisocyanate, 4,4'-di-tert-butyldiphenylsulfone-3,3'-diisocyanate, 4,4'-dimethoxybenzene-ethylenedisulfone-3,3'-diisocyanate, 4,4'-dichlorodiphenylsulfone-3,3'-diisocyanate, 4-methyl-3-isocyanatobenzenesulfonyl-4'-isocyanatophenol ester, 4-methoxy-3-isocyanatobenzenesulfonyl-4'-isocyanatophenol ester, 4-methyl-3-isocyanatobenzenesulfonylanilido-3'-methyl-4'-isocyanate, dibenzenesulfonyl-ethlenediamine-4,4'-diisocyanate, 4,4'-dimethoxybenzenesulfonyl-ethylenediamine-3,3'-diisocyanate, 4-methyl-3-isocyanatobenzenesulfonylanilido-4-methyl-3'-isocyanate, thiophene-2,5-diisocyanate, thiophene-2,5-diisocyanatomethyl, 1,4-dithian-2,-diisocyanate, 1,4-dithian-2,5-diisocyanatomethyl, 1,4-dithian-2,3-diisocyanatomethyl, 1,4-dithian-2-isocyanatomethyl-5-isocyanatopropyl, 1,3-dithiolan-4,5-diisocyanate, 1,3-dithiolan-4,5-diisocyanatomethyl, 1,3-dithiolan-2-methyl-4,5-diisocyanatomethyl, 1,3-dithiolan-2,2-diisocyanatoethyl, tetrahydrothiophene-2,5-diisocyanate, tetrahydrothiophene-2,5-diisocyanatomethyl, tetrahydrothiophene-2,5-diisocyanatoethyl, tetrahydrothiophene-3,4-diisocyanatomethyl, etc.

The polythiol compound includes aliphatic thiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl) thiomalate, 2-mercaptoethyl 2,3-dimercaptosuccinate, 2,3-dimercapto-1-propanol 2-mercaptoacetate, 2,3-dimercapto-1-propanol 3-mercaptoacetate, diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane, etc.; aromatic thiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(trimercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, etc.; halogen (e.g., chlorine or bromine)-substituted aromatic thiols such as 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachloro-1,5-bis(mercaptomethyl)benzene, etc.; aromatic thiols having sulfur atom(s) in addition to mercapto groups, such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, etc., and their derivatives derived through nucleus alkylation, etc.; aliphatic thiols having sulfur atom(s) in addition to mercapto groups, such as bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithian, bis(mercaptomethyl) disulfide, bis(mercaptoethyl) disulfide, bis(mercaptopropyl) disulfide, etc., and their esters with thioglycolic acid and mercaptopropionic acid, as well as hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethylether bis(2-mercaptoacetate), 2-mercaptoethylether bis(3-mercaptopropionate), 1,4-dithian-2,5-diol bis(2-mercaptoacetate), 1,4-dithian-2,5-diol bis(3-mercaptopropionate), bis(2-mercaptoethyl) thioglycolate, bis(2-mercaptoethyl) thiodipropionate, bis(2-mercaptoethyl) 4,4'-thiodibutyrate, bis(2-mercaptoethyl) dithiodiglycolate, bis(2-mercaptoethyl) dithiodipropionate, bis(2-mercaptoethyl) 4,4'-dithiodibutyrate, bis(2,3-dimercaptopropyl) thiodiglycolate, bis(2,3-dimercaptopropyl) thiodipropionate, bis(2,3-dimercaptopropyl)dithiodiglycolate, (2,3-dimercaptopropyl)dithiodipropionate, 4-mercaptomethyl-3,6-dithiaoctane-1,8-dithiol, bis(mercaptomethyl)-3,6,9-trithia-1,11-undecanedithiol, bis(1,3-dimercapto-2-propyl) sulfide, etc.; heterocyclic compounds having sulfur atom(s) in addition to mercapto groups, such as 3,4-thiophenedithiol, tetrahydrothiophene-2,5-dimercaptomethyl, 2,5-dimercapto-1,3,4-thiadiazole, 2,5-dimercapto-1,4-dithian, 2,5-dimercaptomethyl-1,4-dithian, etc. Of these, preferred for use in the invention are isocyanate compounds having sulfur atom(s), and polythiol compounds having sulfur atom(s) in addition to mercapto groups, as providing high-refractivity plastic lenses for spectacles.

The polyol compound includes, for example, aliphatic polyols such as ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, triethylene glycol, polyethylene glycol, tris(2-hydroxyethyl) isocyanurate, cyclobutanediol, cyclopentanediol, cyclohexanediol, cycloheptanediol, cyclooctanediol, bicyclo[4.3.0]-nonanediol, dicyclohexanediol, tricyclo[5.3.1.]dodecanediol, spiro[3.4]octanediol, butylcyclohexanediol, etc.; aromatic polyols such as dihydroxynaphthalene, trihydroxynaphthalene, tetrahydroxynaphthalene, dihydroxybenzene, benzenetriol, trihydroxyphenanthrene, bisphenol A, bisphenol F, xylylene glycol, tetrabromobisphenol A, etc., and their adducts with alkylene oxides such as ethylene oxide, propylene oxide, etc.; bis[4-(hydroxyethoxy)phenyl] sulfide, bis-[4-(2-hydroxypropoxy) phenyl] sulfide, bis-[4-(2,3-dihydroxypropoxy)phenyl] sulfide, bis-[4-(4-hydroxycyclohexyloxy)phenyl] sulfide, bis-[2-methyl-4-(hydroxyethoxy)-6-butylphenyl] sulfide, and their adducts with at most 3 molecules on average, per one hydroxyl group, of ethylene oxide and/or propylene oxide; polyols having sulfur atoms(s), such as di-(2-hydroxyethyl)sulfide, 1,2-bis-(2-hydroxyethylmercapto) ethane, bis(2-hydroxyethyl)disulfide, 1,4-dithian-2,5-diol, bis(2,3-dihydroxypropyl)sulfide, tetrakis(4-hydroxy-2-thiabutyl)methane, bis(4-hydroxyphenyl) sulfone (trade name, bisphenol S), tetrabromobisphenol S, tetramethylbisphenol S, 4,4'-thiobis(6-tert-butyl-3-methylphenol), 1,3-bis(2-hydroxyethylthioethyl)-cyclohexane, etc. Of these, preferred for use in the invention are polyol compounds having sulfur atom(s), as providing high-refractivity plastic lenses for spectacles.

(Thio)urethane monomers are known. References concretely disclosing the monomers are, for example, Japanese Patent Laid-Open Nos. 127914/1983, 136601/1982, 163012/1989, 236386/1991, 281312/1991, 159275/1992, 148340/1993, 065193/1994, 256459/1994, 313801/1994, 192250/1994, 063902/1995, 104101/1995, 118263/1995, 118390/1995, 316250/1995, 199016/1985, 217229/1985, 236818/1987, 255901/1987, 267316/1987, 130615/1988, 130614/1988, 046213/1988, 245421/1988, 265201/1988, 090167/1989, 090168/1989, 090169/1989, 090170/1989, 096208/1989, 152019/1989, 045611/1989, 213601/1989, 026622/1989, 054021/1989, 311118/1989, 295201/1989, 302202/1989, 153302/1990, 295202/1989, 802/1990, 036216/1990, 058517/1990, 167330/1990, 270859/1990, 84031/1991, 084021/1991, 124722/1991, 78801/1992, 117353/1992, 117354/1992, 256558/1992, 78441/1993, 273401/1993, 093801/1993, 080201/1993, 297201/1993, 320301/1993, 208950/1993, 072989/1994, 256342/1994, 122748/1994, 165859/1995, 118357/1995, 242722/1995, 247335/1995, 252341/1995, 73732/1996, 092345/1996, 228659/1995, 3267/1996, 252207/1995, 324118/1995, 208651/1997, etc. Needless to say, the polyisocyanate compounds, polyol compounds and polythiol compounds disclosed in these patent publications are all in the category of (thio)urethane monomers for use herein.

Also needless to say, it is possible to add any other plastic lens monomers such as episulfide monomers, diethylene glycol allylcarbonate monomers and others to these (thio) urethane monomers for improving the physical properties such as heat resistance, refractivity and others of the plastic lenses to be produced herein.

The lenses obtained by polymer of a diethylene glycol bisallylcarbonate monomer include lenses of diethylene glycol bisallylcarbonate homopolymer and lenses of copolymers of diethylene glycol bisallylcarbonate and other monomers copolymerizable with it. Specific examples of such comonomers are aromatic vinyl compounds such as styrene, a-methylstyrene, vinyltoluene, chlorostyrene, chloromethylstyrene, divinylbenzene, etc.; mono(meth) acrylates such as methyl (meth)acrylate, n-butyl (meth) acrylate, n-hexyl (meth)acrylate, cyclohexyl (meth)acrylate, 2-ethylhexyl (meth)acrylate, methoxydiethylene glycol (meth)acrylate, methoxypolyethylene glycol (meth)acrylate, 3-chloro-2-hydroxypropyl (meth)acrylate, stearyl (meth) acrylate, lauryl (meth)acrylate, phenyl (meth)acrylate, glycidyl (meth)acrylate, benzyl methacrylate, etc.; mono(meth) acrylates having hydroxyl group(s), such as 2-hydroxyethyl (meth)acrylate, 2-hydroxypropyl (meth)acrylate, 3-hydroxypropyl (meth)acrylate, 3-phenoxy-2-hydroxypropyl (meth)acrylate, 4-hydroxybutyl (meth) acrylate, etc.; di(meth)acrylates such as ethylene glycol di(meth)acrylate, diethylene glycol di(meth)acrylate triethylene glycol di(meth)acrylate, polyethylene glycol di(meth) acrylate, 1,3-butylene glycol di(meth)acrylate, 1,6-hexanediol di(meth)acrylate, neopentyl glycol di(meth) acrylate, polypropylene glycol di(meth)acrylate, 2-hydroxy-1,3-di(meth)acryloxypropane, 2,2-bis[4-((meth) acryloxyethoxy)phenyl]propane, 2,2-bis[4-((meth) acryloxy-diethoxy)phenyl]propane, 2,2-bis[4-((meth) acryloxy-polyethoxy)phenyl]propane, etc.; tri(meth) acrylates such as trimethylolpropane trimethacrylate, tetramethylolmethane trimethacrylate, etc.; tetra(meth) acrylates such as tetramethylolmethane tetra(meth)acrylate, etc.; diallyl phthalate, diallyl isophthalate, diallyl terephthalate, etc. (Meth)acrylate referred to herein is meant to indicate methacrylate or acrylate. Of these, preferred for use herein are aromatic monomers, as providing high-refractivity plastic lenses for spectacles.

Copolymers of diethylene glycol bisallylcarbonate and other monomers are known. Their examples are disclosed in Japanese Patent Laid-Open Nos. 41965/1979, 125487/1976, Japanese Patent Re-Laid-Open No. 503809/1989, etc. Needless to say, the mixtures of diethylene glycol bisallylcarbonate; and monomers copolymerizable with it disclosed in these patent publications are all in the category of diethylene glycol bisallylcarbonate monomers for use herein.

Poly(thio)urethane lenses and lenses obtained by polymer of a diethylene glycol bisallylcarbonate monomer to which the invention is directed are prepared by polymerizing the above-mentioned plastic lens monomers. The method of polymerizing the plastic lens monomers is not specifically defined, for which, however, generally employed is cast polymerization. Specifically, a plastic lens monomer such as that mentioned above is cast into a mold for lenses, and heated therein at a temperature falling between −20° C. and 150° C. to give plastic lenses for spectacles. To the plastic lens monomer, if desired, optionally added are a polymerization catalyst such as that described in Japanese Patent laid-Open Nos. 063902/1995, 104101/1995, 208621/1997, 255781/1997, etc.; and an internal release agent, an antioxidant and any other auxiliary agents such as those described in Japanese Patent Laid-Open Nos. 163012/1989, 281312/1991, etc.

Also if desired, the plastic lenses for spectacles of the invention may be optionally colored with a colorant. For improving their scratch resistance, the plastic lenses may be coated with a hard film, for which is usable a coating liquid that contains an organosilicon compound or inorganic fine particles of tin oxide, silicon oxide, zirconium oxide, titanium oxide, etc. For improving their impact resistance, the plastic lenses may be coated with a primer layer that consists essentially of polyurethane. For preventing them from glaring, the plastic lenses may be coated with an anti-glare film that contains silicon oxide, titanium dioxide, zirconium oxide, tantalum oxide, etc. For improving their water repellency, the anti-glare film of the plastic lenses may be coated with a water-repellent film of a flourine atom-containing organosilicon compound.

The plastic lenses for spectacles of the invention are produced by dipping specific plastic lenses in a solution containing a specific UV absorbent, and are therefore free from the problems with lenses produced by adding a UV absorbent to a plastic lens monomer followed by polymerizing the monomer. The problems include optical strain and fog of lenses. In the lens for spectacles produced by adding a UV absorbent to a plastic lens monomer followed by polymerizing the monomer, the UV absorbent added is uniformly dispersed throughout it. As opposed to it, the plastic lenses for spectacles of the invention are produced by dipping plastic lenses in a UV absorbent solution in such a manner that the UV absorbent could infiltrate into the lenses. Therefore, in the plastic lens of the invention, the UV absorbent exists only on the surface and near a surface of the lens, but does not penetrate through the surface to reach the depth of the lens.

The plastic lenses for spectacles of the invention may be of different types, and will be suitably selected depending on their applications. For example, one embodiment of the plastic lenses for spectacles to be provided by the invention is such that the center of the lens, when having a thickness of from 1.8 to 2.2 mm, has an yellow index (YI) falling between 0.8 and 1.2 and a 385 nm UV transmittance falling between 1 and 4%.

EXAMPLES

The invention is described concretely with reference to the following Examples, which, however, are not intended to restrict the scope of the invention. The physical properties of the plastic lenses produced herein are measured according to the methods mentioned below.
1. Yellowness Index (YI)

This is measured according to JIS K7103-1977 that indicates the yellow index of plastics and test methods for determining the yellow index of plastics.
2. Transmittance The 385 nm UV transmittance of each plastic lens is measured, using a spectrophotometer, Hitachi's U3410.

Example 1

To 100 parts by weight of diethylene glycol bisallylcarbonate, added was 3 parts by weight of diisopropyl peroxydicarbonate, and these were fully stirred and mixed. The resulting mixture was cast into a glass mold for lenses (lens power: D0.00, lens diameter 70 mm, lens thickness 2.2 mm), which had been previously prepared and equipped with a resin gasket. The mold was put into an electric furnace, and gradually heated therein from 40° C. up to 90° C. over a period of 20 hours and then kept heated at 90° C. for 1 hour, through which the monomer was polymerized.

After the polymerization, the gasket and the mold were released, and the lens formed was further heated at 120° C. for 1 hour.

On the other hand, 7.5 g of 4-tert-butyl-4'-methoxydibenzoylmethane serving as a UV absorbent, and 10 ml of Nikka Sunsalt 7000 (Nikka Chemical's nonionic surfactant) were added to 1 liter of water to prepare a UV absorbent solution, which is for processing lenses to produce UV-absorbing lenses. This was kept heated at 85° C.

The lens prepared hereinabove was dipped in the UV absorbent solution for 40 minutes, and then subjected to heat treatment at 120° C. for 1 hour. Through the process, the UV absorbent was infiltrated into the plastic lens.

Figure 1:
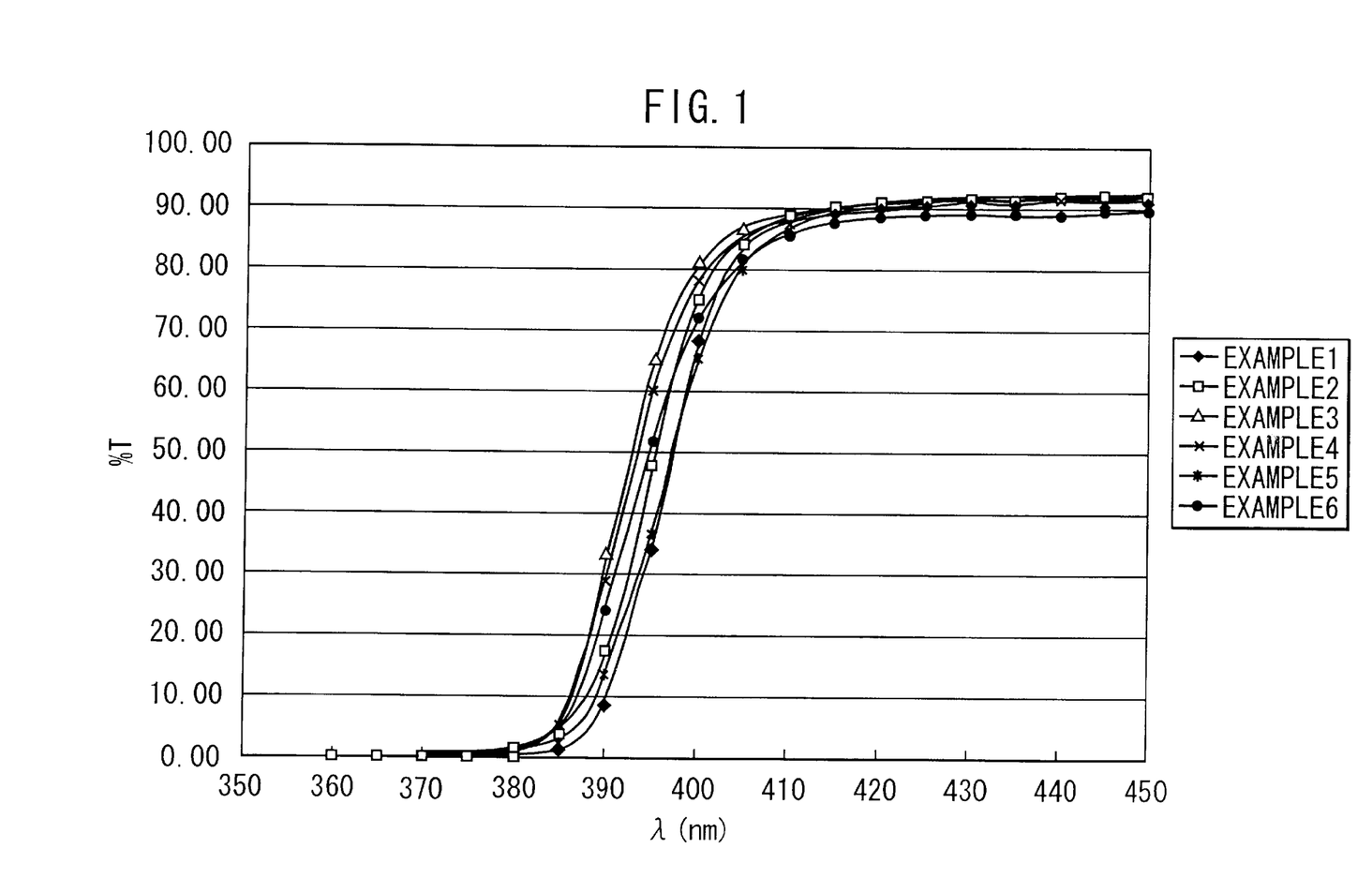
FIG. 1 is a graph showing the spectral curves through the lenses of Examples 1 to 6.

The center (having a thickness of 2.2 mm) of the lens thus obtained had YI of 1.0. The lens was slightly yellowish, but its 385 nm UV transmittance was 1% and its UV-cutting capability was good. The spectral curve through the lens is shown in FIG. 1.

Example 2

A lens was produced in the same manner as in Example 1, for which, however, the UV absorbent solution used did not contain a surfactant.

The center (having a thickness of 2.2 mm) of the lens thus obtained had YI of 0.9. The lens was slightly yellowish, but its 385 nm UV transmittance was 4% and its UV-cutting capability was good. The spectral curve through the lens is shown in FIG. 1.

Example 3

A lens was produced in the same manner as in Example 1, for which, however, the UV absorbent solution used was prepared by adding 7.5 g of dibenzoylmethane and 10 ml of Nikka Sunsalt 7000 (Nikka Chemical's nonionic surfactant) to 1 liter of water.

The center (having a thickness of 2.2 mm) of the lens thus obtained had YI of 1.1. The lens was slightly yellowish, but its 385 nm UV transmittance was 4% and its UV-cutting capability was good. The spectral curve through the lens is shown in FIG. 1.

Example 4

A lens was produced in the same manner as in Example 1, for which, however, the UV absorbent solution used was prepared by adding 7.5 g of 2-(2,4-dihydroxyphenyl)-benzotriazole and 10 ml of Nikka Sunsalt 7000 (Nikka Chemical's nonionic surfactant) to 1 liter of water.

The center (having a thickness of 2.2 mm) of the lens thus obtained had YI of 1.1. The lens was slightly yellowish, but its 385 nm UV transmittance was 4% and its UV-cutting capability was good. The spectral curve,through the lens is shown in FIG. 1.

Example 5

A lens was produced in the same manner as in Example 1, for which, however, the UV absorbent solution used was prepared by adding 7.5 g of 5-chloro-2-(2,4-dihydroxyphenyl)-benzotriazole and 10 ml of Nikka Sunsalt 7000 (Nikka Chemical's nonionic surfactant) to 1 liter of water.

The center (having a thickness of 2.2 mm) of the lens thus obtained had YI of 1.0. The lens was slightly yellowish, but its 385 nm UV transmittance was 3% and its UV-cutting capability was good. The spectral curve through the lens is shown in FIG. 1.

Example 6

0.45 parts by weight of dimethyl tin dichloride, and 0.16 parts by weight of an acid phosphate, JP506 (Johoku Chemical's lubricant) were added to and mixed with 47.5 parts by weight of 1,3-diisocyanatomethylcyclohexane, to which were added 26.0 parts by weight of 2,5-dimercaptomethyl-1,4-dithian and 26.5 parts by weight of pentaerythritol tetrakismercaptoacetate, and further stirred under a reduced pressure of 10 mHg for 30 minutes to prepare a monomer composition for lenses.

Next, the monomer composition was cast into a glass mold for lenses (lens power: D0.00, lens diameter 80 mm, lens thickness 1.6 mm), which had been previously prepared and equipped with a resin gasket. The mold was put into an electric furnace, and gradually heated therein from 20° C. up to 100° C. over a period of 20 hours. After having been thus heated, this was once taken out of the furnace, and its gasket was removed. Then, it was again put into the furnace, heated therein up to 120° C. over a period of 1 hour, and then kept heated at 120° C. for 3 hours. Through the process, the monomers were polymerized.

After the polymerization, the mold was released, and the lens formed was further heated at 120° C. for 1 hour.

On the other hand, 7.5 g of dibenzoylmethane and 10 ml of Nikka Sunsalt 7000 (Nikka Chemical's nonionic surfactant) were added to 1 liter of water to prepare a UV absorbent solution. This was kept heated at 85° C.

The lens prepared hereinabove was dipped in the UV absorbent solution for 40 minutes, and then subjected to heat treatment at 120° C. for 1 hour. Through the process, the UV absorbent was infiltrated into the plastic lens.

The center (having a thickness of 2.2 mm), of the lens thus obtained had YI of 1.0. The lens was slightly yellowish, but its 385 nm UV transmittance was 5% and its UV-cutting capability was good. The spectral curve through the lens is shown in FIG. 1.

The data as above are summarized in Table 1.

(Nikka Chemical's nonionic surfactant) to 1 liter of water, and the processing time was 5 minutes.

Figure 2:
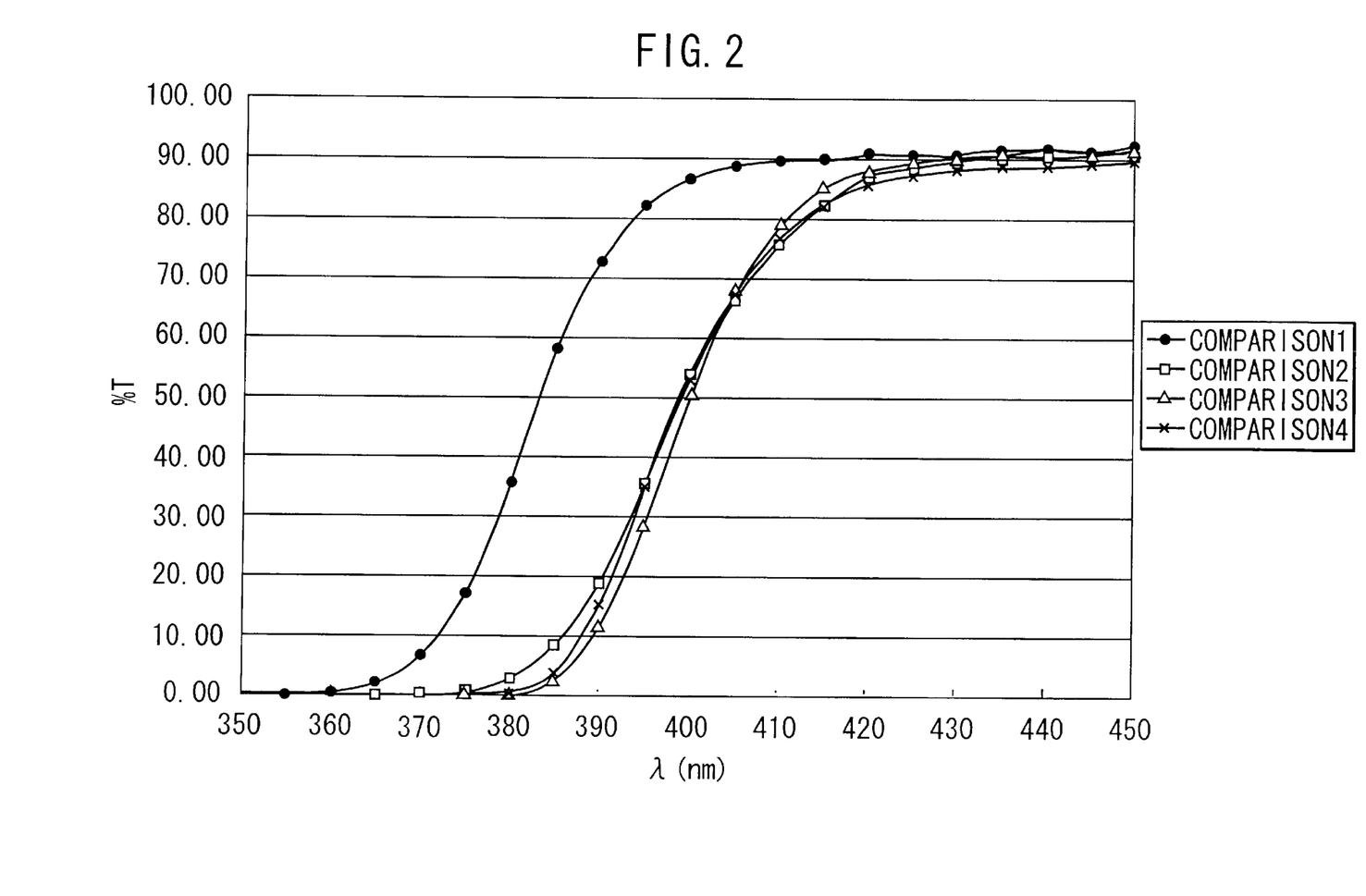
FIG. 2 is a graph showing the spectral curves through the lenses of Comparative Examples 1 to 4.

The center (having a thickness of 2.2 mm) of the lens thus obtained had YI of 1.8. The lens was slightly yellowish, but its 385 nm UV transmittance was 10% and its UV-cutting capability was good. However, the lens obtained herein was inferior to those obtained in Examples with respect to YI and UV transmittance. The spectral curve through the lens is shown in FIG. 2.

Comparative Example 3

A lens was produced in the same manner as in Example 1, for which, however, the UV absorbent solution used was prepared by adding 7.5 g of 2,2',4,4'-tetrahydroxybenzophenone and 10 ml of Nikka Sunsalt 7000 (Nikka Chemical's nonionic surfactant) to 1 liter of water, and the processing time was 5 minutes.

The center (having a thickness of 2.2 mm) of the lens thus obtained had YI of 1.5. The lens was slightly yellowish, but its 385 nm UV transmittance was 4% arid its UV-cutting capability was good. However, the lens obtained herein was

TABLE 1

| | Starting Monomer(s) (wt. pts.) | UV Absorbent and Surfactant (amount added per liter of water) | Processing Condition ° C. | min | YI | Center Thickness (mm) | 385 nm Transmittance (%) |
|---|---|---|---|---|---|---|---|
| Example 1 | diethylene glycol bisallylcarbonate (100) | 4-tert-butyl-4'-methoxydibenzoylmethane (7.5 g) Nikka Sunsalt 7000 (10 ml) | 85 | 40 | 1.0 | 2.2 | 1 |
| Example 2 | diethylene glycol bisallylcarbonate (100) | 4-tert-butyl-4'-methoxydibenzoylmethane (7.5 g) | 85 | 40 | 0.9 | 2.2 | 4 |
| Example 3 | diethylene glycol bisallylcarbonate (100) | dibenzoylmethane (7.5 g) Nikka Sunsalt 7000 (10 ml) | 85 | 40 | 1.1 | 2.2 | 4 |
| Example 4 | diethylene glycol bisallylcarbonate (100) | 2-(2,4-dihydroxyphenyl)-benzotriazole (7.5 g) Nikka Sunsalt 7000 (10 ml) | 85 | 40 | 1.1 | 2.2 | 4 |
| Example 5 | diethylene glycol bisallylcarbonate (100) | 5-chloro-2-(2,4-dihydroxyphenyl)-benzotriazole (7.5 g) Nikka Sunsalt 7000 (10 ml) | 85 | 40 | 1.0 | 2.2 | 3 |
| Example 6 | 1,3-diisocyanatomethylcyclohexane (47.5) 2,5-dimercaptomethyl-1,4-dithian (26.0) pentaerythritol tetrakismercaptoacetate (26.5) | dibenzoylmethane (7.5 g) Nikka Sunsalt 7000 (10 ml) | 85 | 40 | 1.0 | 1.6 | 5 |

Comparative Example 1

A lens was produced in the same manner as in Example 1, for which, however, the UV absorbent solution used was prepared by adding 7.5 g of 2-(2-hydroxy-5-methylphenyl)-benzotriazole and 10 ml of Nikka Sunsalt 7000 (Nikka Chemical's nonionic surfactant) to 1 liter of water.

The center (having a thickness of 2.2 mm) of the lens thus obtained had YI of 0.8. The lens was almost colorless, but its 385 nm UV transmittance was 58%. The lens has no UV-cutting capability. The spectral curve through the lens is shown in FIG. 2.

Comparative Example 2

A lens was produced in the same manner as in Example 1, for which, however, the UV absorbent solution used was prepared by adding 7.5 g of 2,2'-dihydroxy-4-methoxybenzophenone and 10 ml of Nikka Sunsalt 7000 inferior to those obtained in Examples with respect to YI. The spectral curve through the lens is shown in FIG. 2.

Comparative Example 4

A lens was produced in the same manner as in Example 6, for which, however, the UV absorbent solution used was prepared by adding 7.5 g of 2,2'-dihydroxy-4-methoxybenzophenone and 10 ml of Nikka Sunsalt 7000 (Nikka Chemical's nonionic surfactant) to 1 liter of water, and the processing time was 15 minutes.

The center (having a thickness of 1.6 mm) of the lens thus obtained had YI of 1.6. The lens was slightly yellowish, but its 385 nm :UV transmittance was 5% and its UV-cutting capability was good. However, the lens obtained herein was inferior to those obtained in Examples with respect to YI. The spectral curve through the lens is shown in FIG. 2.

The data as above are summarized in Table 2.

TABLE 2

| | Starting Monomer(s) (wt. pts.) | UV Absorbent and Surfactant (amount added per liter of water) | Processing Condition °C. | Processing Condition min | YI | Center Thickness (mm) | 385 nm Transmittance (%) |
|---|---|---|---|---|---|---|---|
| Comparative Example 1 | diethylene glycol bisallylcarbonate (100) | 2-(2-hydroxy-5-methylphenyl)-benzotriazole (7.5 g) Nikka Sunsalt 7000 (10 ml) | 85 | 40 | 0.8 | 2.2 | 58 |
| Comparative Example 2 | diethylene glycol bisallylcarbonate (100) | 2,2'-dihydroxy-4-methoxybenzophenone (7.5 g) Nikka Sunsalt 7000 (10 ml) | 85 | 5 | 1.8 | 2.2 | 10 |
| Comparative Example 3 | diethylene glycol bisallylcarbonate (100) | 2,2',4,4'-tetrahydroxybenzophenone (7.5 g) Nikka Sunsalt 7000 (10 ml) | 85 | 5 | 1.5 | 2.2 | 4 |
| Comparative Example 4 | 1,3-diisocyanatomethylcyclohexane (47.5) 2,5-dimercaptomethyl-1,4-dithian (26.0) pentaerythritol tetrakismercaptoacetate (26.5) | 2,2'-dihydroxy-4-methoxybenzophenone (7.5 g) Nikka Sunsalt 7000 (10 ml) | 85 | 15 | 1.6 | 1.6 | 5 |

What is claimed is:

1. An optical lens comprising a body of a polythiourethane material or a diethylene glycol bisallylcarbonate polymer material and a dibenzoylmethane compound, said dibenzoylmethane compound having a general formula (1):

(1)

wherein R and R' each represent a linear or branched alkyl group having from 1 to 8 carbon atoms, or a linear or branched alkoxyl group having from 1 to 8 carbon atoms; and n and n' are the same or different integers, and each is from 0 to 3.

2. The optical lens of claim 1, wherein said optical lens absorbs long-wave UV rays having a wavelength of around 400 nm.

3. The optical lens of claim 1, wherein said optical lens has a yellowness index (YI) between about 0.8 and 1.2 and a 385 nm UV transmittance between about 1 and 4% when a thickness of said optical lens is of from about 1.8 to 2.2 mm.

4. An optical lens comprising a body of a diethylene glycol bisallylcarbonate polymer material and a benzotriazole compound, said benzotriazole compound having a general formula (2):

(2)

wherein R" represents a hydrogen atom, a chlorine atom or a bromine atom; and m and m' each indicate 1 or 2.

5. The optical lens of claim 4, wherein said optical lens absorbs long-wave UV rays having a wavelength of around 400 nm.

6. The optical lens of claim 4, wherein said optical lens has a yellowness index (YI) between about 0.8 and 1.2 and a 385 nm UV transmittance between about 1 and 4% when a thickness of said optical lens is of from about 1.8 to 2.2 mm.

7. Spectacles comprising said optical lens according to any one of claims 1–6.

8. A method for producing an optical lens, comprising:

forming a poly(thio)urethane material or a diethylene glycol bisallylcarbonate polymer material into a body and dipping said body in a solution containing a dibenzoylmethane compound of a general formula (1):

(1)

wherein R and R' each represent a linear or branched alkyl group having from 1 to 8 carbon atoms, or a linear or branched alkoxyl group having from 1 to 8 carbon atoms; and n and n' are the same or different integers, and each falling is from 0 to 3, so that said dibenzoylmethane compound is on a surface of said body or within said body.

9. The method of claim 8, further comprising subjecting said body to a heat treatment to permit said dibenzoylmethane compound to infiltrate into said body.

10. A method for producing an optical lens, comprising:

forming a polythiourethane material or a diethylene glycol bisallylcarbonate polymer material into a body and dipping said body in a solution containing a benzotriazole compound of a general formula (2):

(2)

wherein R" represents a hydrogen atom, a chlorine atom or a bromine atom; and m and m' each indicate 1 or 2.

11. The method of claim 10, further comprising subjecting said coated optical material to heat treatment to permit said benzotriazole compound to infiltrate into said body.

12. An optical lens comprising a body of a polythiourethane material or a diethylene glycol bisallylcarbonate polymer material and a benzotriazole compound, said benzotriazole compound having a general formula (2):

(2)

13. The optical lens of claim 12, wherein said optical lens absorbs long-wave UV rays having a wavelength of around 400 nm.

14. The optical lens of claim 12, wherein said optical lens has a yellowness index (YI) between about 0.8 and 1.2 and a 385 nm UV transmittance between about 1 and 4% when a thickness of said optical lens is of from about 1.8 to 2.2 mm.

15. A method for producing an optical lens, comprising:

forming a polythiourethane material or a diethylene glycol bisallylcarbonate polymer material into a body and dipping said body in a solution containing a benzotriazole compound of a general formula (2):

(2)

* * * * *